(12) United States Patent
Hu et al.

(10) Patent No.: US 7,980,628 B2
(45) Date of Patent: Jul. 19, 2011

(54) CONVERTIBLE FOLDING SEAT AND STORAGE COMBINATION

(75) Inventors: Jun Hu, Simpsonville, SC (US); Robert Weist, Simpsonville, SC (US)

(73) Assignee: JH Global Services, Inc., Greenville, SC (US)

( * ) Notice: Subject to any disclaimer, the term of this patent is extended or adjusted under 35 U.S.C. 154(b) by 366 days.

(21) Appl. No.: 12/029,544

(22) Filed: Feb. 12, 2008

(65) Prior Publication Data

US 2008/0211270 A1    Sep. 4, 2008

Related U.S. Application Data

(60) Provisional application No. 60/904,533, filed on Mar. 1, 2007.

(51) Int. Cl.
  *A47C 7/62*    (2006.01)
  *B60R 7/04*    (2006.01)

(52) U.S. Cl. ............... 297/188.1; 296/37.15; 296/37.16; 296/69

(58) Field of Classification Search ............. 297/188.09, 297/188.1; 296/37.15, 37.16, 69
See application file for complete search history.

(56) References Cited

U.S. PATENT DOCUMENTS

| | | | | |
|---|---|---|---|---|
| 2,628,146 | A * | 2/1953 | De Rennaux | 297/188.1 |
| 3,671,071 | A * | 6/1972 | Evinrude | 296/69 X |
| 4,125,284 | A * | 11/1978 | Hicks et al. | 296/69 |
| 4,311,205 | A * | 1/1982 | Goodacre et al. | 296/37.15 |
| 4,699,418 | A * | 10/1987 | Plavetich | 296/69 X |
| D345,717 | S | 4/1994 | Molzon et al. | |
| D369,762 | S | 5/1996 | Molzon et al. | |
| D373,099 | S | 8/1996 | Molzon et al. | |
| D395,023 | S | 6/1998 | Hikida | |
| 6,540,279 | B1 * | 4/2003 | Bargiel | 296/37.15 X |
| D498,704 | S | 11/2004 | Bonner et al. | |
| D514,981 | S | 2/2006 | Andrews et al. | |
| 7,677,655 | B2 * | 3/2010 | Marsh | 297/188.1 X |

* cited by examiner

*Primary Examiner* — Anthony D Barfield
(74) *Attorney, Agent, or Firm* — Dority & Manning, P.A.

(57) ABSTRACT

A folding seat combination is configured for use with and installation on a vehicle such as a golf cart type recreational vehicle. The folding seat combination provides selective positioning of seat, footrest, and backrest components, respectively each between upright and downward positions thereof, to alternately accommodate easy transport of either of additional passengers or materials. With the seat and footrest features in their upright positions and the backrest in its upward position, optional golf bag securing straps may be used to secure golf bags in the cart, as so configured for the transportation of materials rather than passengers in such location. With the footrest in an upright position, relatively loose items stored in an otherwise relatively open storage area of the cart may be contained and prevented from bouncing out during operation the cart.

13 Claims, 6 Drawing Sheets

CONVERTIBLE FOLDING SEAT AND STORAGE COMBINATION

This application claims the benefit of previously filed U.S. Provisional Patent Application entitled "FOLDING SEAT COMBINATION," assigned U.S. Ser. No. 60/904,533 filed Mar. 1, 2007, and which is incorporated herein by reference for all purposes.

FIELD OF THE INVENTION

The present subject matter relates to accessories for recreational vehicles. More specifically, the present subject matter is directed to a convertible folding seat and storage combination for use with a golf cart type recreational vehicle.

BACKGROUND OF THE INVENTION

The use of golf cart type recreational vehicles is well known in recreational and sporting environments. In addition to use on golf courses to transport golfers and their equipment, such carts find other uses in fulfilling transportation needs in other types of off road environments as well such as, but not limited to, transportation of individuals and materials in large convention halls or outdoor areas where it may desirable to transport individuals or materials quickly and where other types of conveyances may not be appropriate because of size and other considerations.

Various arrangements of golf cart type vehicles are known and manufactured by companies including E-Z-Go, Club Car, Yamaha, Textron, and Fairplay, such as represented by the disclosures of U.S. Design Pat. Nos. D345,717; D369,762; D373,099; D395,023; D498,704; and D514,981.

In many instances known golf cart type recreational vehicles provide storage space in the rear portion of the cart so that various items in addition to a driver and, possibly, a passenger, may also be transported. Further, it is known to provide additional seating in the rear of similar type carts. Such seating may be configured to face forward or rearward but most often these seats may be configured to be positioned only in one direction or the other. Quite often such seats are substantially permanently installed so that use of such carts is more limited and less versatile.

In light of recognized deficiencies in known golf cart type recreational vehicles, alternative seating accessories that provide configuration variety to afford maximum use of the golf cart type recreational vehicles for all types of transportation needs remains a desired goal.

While various implementations of golf cart seating accessories and golf bag securing configurations have been developed, no design has emerged that generally encompasses all of the desired characteristics as hereafter presented in accordance with the present subject matter.

SUMMARY OF THE INVENTION

In view of the recognized features encountered in the prior art and addressed by the present subject matter, improved convertible (folding) seat combinations for use with golf cart type recreational vehicles have been developed.

In an exemplary configuration, a convertible folding seat and storage combination in accordance with the present technology provides a folding seat combination apparatus that may either be retrofitted to a golf cart type recreational vehicle, or provided as original equipment to such a vehicle, to provide additional seating for individuals or alternatively to secure transportation of golf bags or other items. In such exemplary configuration, the present subject matter may be disposed in alternate positions thereof, one for accommodating seating functionality (for persons) and another for accommodating transportation of materials.

It should be appreciated that while the present subject matter is described herein as being for use with golf cart type recreational vehicles, such is not a limitation of the present subject matter as the convertible folding seat and storage combination may well be used in combination with other type vehicles. For example, the convertible folding seat and storage combination might be mounted on the rear of a small utility type pick-up truck where optional seating might be used and a functional "tailgate" can be provided by placing the footrest of the present subject matter in an upright position.

In one of its simpler forms, a convertible folding seat and storage combination may incorporate a frame configured for attachment to a golf cart type recreational vehicle that includes a seat portion that, in a first down position may provide additional seating for individuals and in an up position may provide access to a storage area of the cart.

Another positive aspect of such type of device is that the folding seat combination may optionally include securing straps attached to the underside of a seat cushion that may be used to secure golf bags or other items for transport in the cart while the seat is in an up position thereof.

In accordance with aspects of certain embodiments of the present subject matter, a footrest feature may be provided that may be configured to be moved between respective up or down positions. When moved to its down position, the footrest provides a footrest function for individual passengers. In an exemplary up position thereof, the footrest provides a partial closure for the normally open storage area of a golf cart type recreational vehicle so as to assist in retaining items relatively loosely placed in the storage area formed thereby.

In accordance with certain aspects of other embodiments of the present subject matter, the folding seat combination includes a backrest cushion portion that may also be positioned in an alternate up or down position. In an exemplary down position thereof, the backrest cushion portion provides a backrest function for individual passengers while in an exemplary up position thereof the backrest cushion portion may cooperate with the seat portion while it is in an up position to assist in securing the seat portion in the up position.

In accordance with yet additional aspects of further embodiments of the present subject matter, a latching apparatus may be provided to secure the footrest in an exemplary up position thereof.

One present exemplary embodiment may relate to a convertible folding seat and storage combination, comprising a frame configured for attachment to a vehicle; a seat portion movably attached to such frame, such seat portion having an upper side and an underside, with a storage area formed under such seat portion; a backrest portion attached to such frame; and a footrest portion attached to such frame. Preferably, such seat portion is movably attached to such frame such that such seat portion may selectively be alternately positioned in one of a down position thereof so as to provide seating for an individual with such storage area situated thereunder, and in an up position thereof so as to provide full access to such storage area.

Other present exemplary embodiments of such present exemplary convertible folding seat and storage combination may include other features, for example, such as such backrest portion and footrest portion may be respectively movably attached to such frame such that such backrest portion and footrest portion may selectively be alternately positioned in one of respective down positions thereof so as to provide a backrest and footrest respectively for an individual seated on such seat portion when in the down position thereof, and in respective up positions thereof for assisting to secure such seat portion and to provide at least partial closure of such storage area respectively when such seat portion is in the up position thereof. Still further, such combination may also include at least one pair of securing straps attached to such underside of such seat portion, for securing at least one item for transport while such seat portion is in an up position thereof. Also, certain embodiments may include a latch movably attached to such frame, and configured to be selectively engaged with such footrest portion such that such latch may secure such footrest portion in such up position thereof.

Another present exemplary embodiment may relate to a vehicle, comprising a front seat configured to provide seating for a vehicle operator; and a rear convertible seat comprising a frame attached to such vehicle, a seat portion attached to such frame with a storage area formed under such seat portion, a backrest portion attached to such frame, and a footrest portion attached to such frame. Preferably, such seat portion may be movably attached to such frame such that such seat portion may selectively be alternately positioned in one of a down position thereof so as to provide seating for an individual with such storage area situated thereunder, and in an up position thereof so as to provide full access to such storage area. Still further, such vehicle may comprise a golf cart type recreational vehicle, and include a securing device for securing at least one golf bag to such vehicle.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or materials for those illustrated, referenced, or discussed, and the functional, operational, or positional reversal of various parts, features, or the like.

Still further, it is to be understood that different embodiments, as well as different presently preferred embodiments, of the present subject matter may include various combinations or configurations of presently disclosed features, steps, or their equivalents (including combinations of features, parts, or configurations thereof not expressly shown in the figures or stated in the detailed description of such figures). Additional embodiments of the present subject matter, not necessarily expressed in the summarized section, may include and incorporate various combinations of aspects of features or components referenced in the summarized objects above, and/or other features or components as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
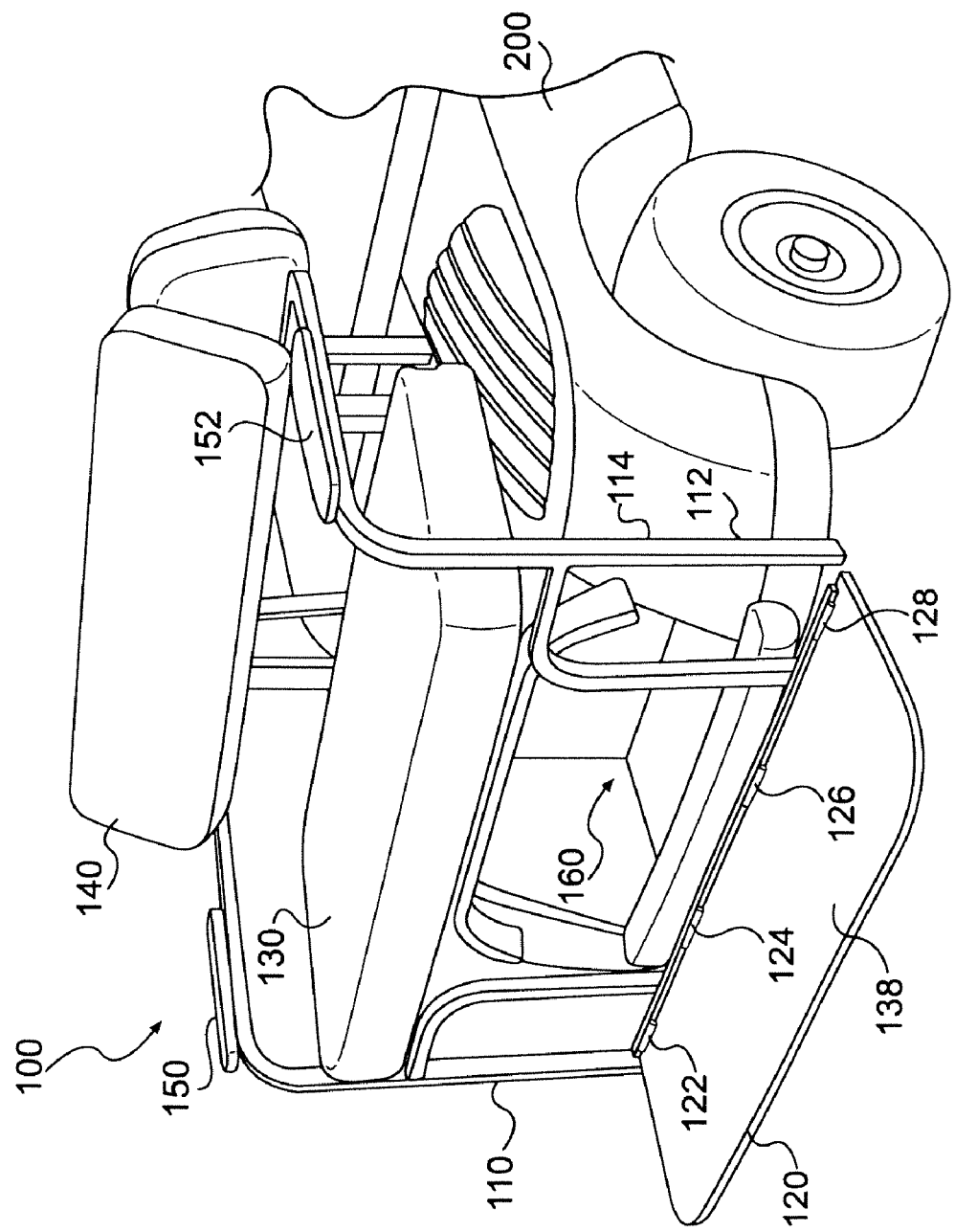
FIG. 1 illustrates a right rear oblique view of an exemplary golf cart with an exemplary convertible folding seat and storage combination constructed in accordance with the present technology, secured to the exemplary golf cart, and with such convertible combination features in respective exemplary down positions thereof.

Repeat use of reference characters throughout the present specification and appended drawings is intended to represent same or analogous features or elements of the present subject matter.

DETAILED DESCRIPTION OF THE PREFERRED EMBODIMENTS

As discussed in the Summary of the Invention section, the present subject matter is particularly concerned with improved convertible folding seat and storage combination subject matter for use with golf cart type recreational vehicles.

Selected combinations of aspects of the disclosed technology correspond to a plurality of different embodiments of the present subject matter. It should be noted that each of the exemplary embodiments presented and discussed herein should not insinuate limitations of the present subject matter. Features or aspects illustrated or described as part of one embodiment may be used in combination with aspects of another embodiment to yield yet further embodiments. Additionally, certain features may be interchanged with similar devices or features not expressly mentioned but which perform the same or similar function.

Reference will now be made in detail to the presently preferred embodiments of the subject convertible folding seat and storage combination (also referred to herein as a folding seat combination, or other shortened references). Referring now to the drawings, FIG. 1 illustrates a right rear oblique view of a golf cart generally 200 with the subject folding seat combination generally 100 constructed in accordance with the present technology attached. As may be seen in FIG. 1, folding seat combination 100 corresponds to a frame generally 110 to which footrest 120, seat 130, backrest 140, and a respective pair of armrests 150, 152 may be secured. A more detailed description of frame 110 is presented in connection with present FIG. 3.

Figure 2:
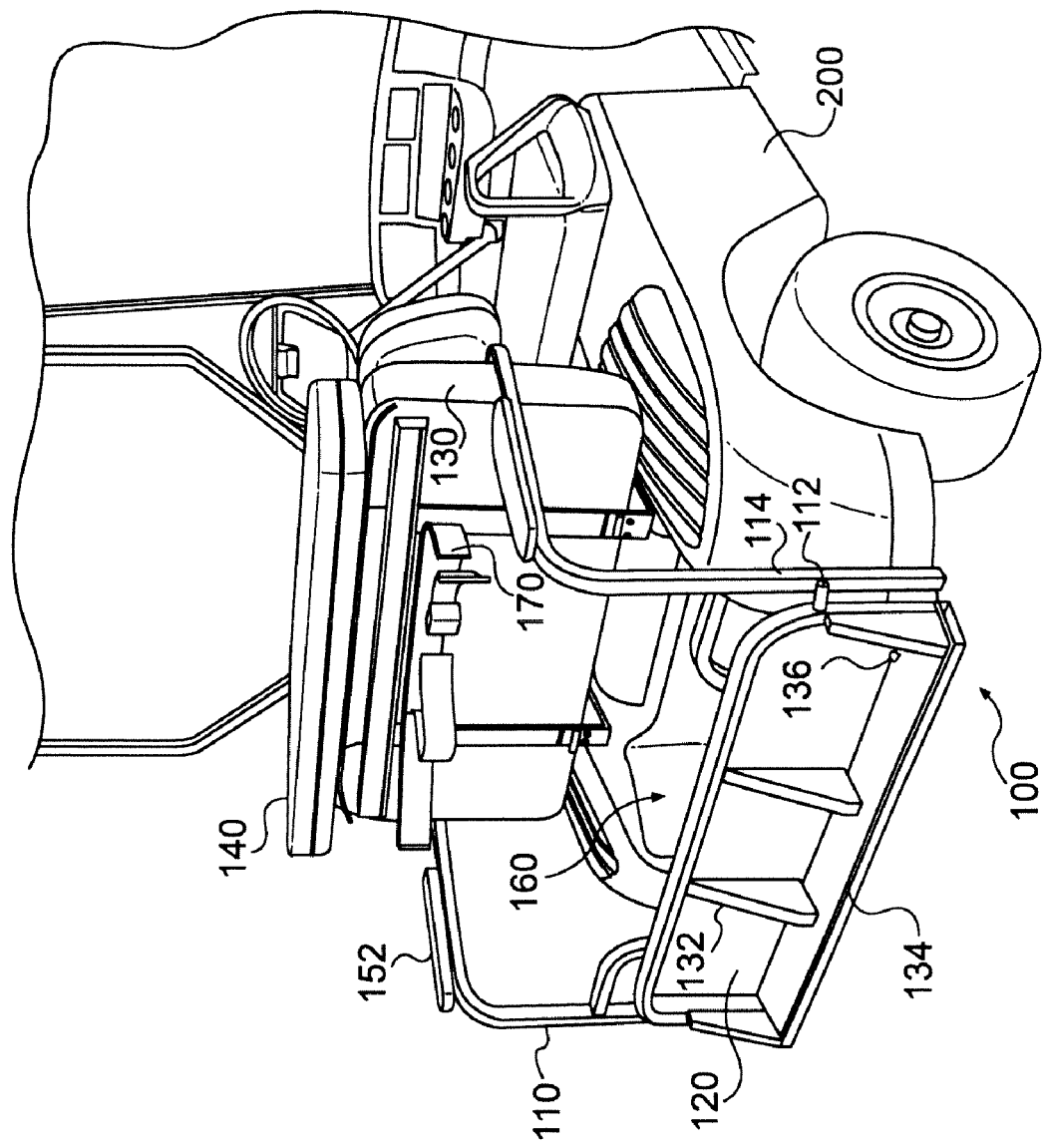
FIG. 2 illustrates a right rear oblique view of an exemplary golf cart, similar to the FIG. 1 view thereof, with an exemplary present convertible folding seat and storage combination attached, and illustrating the present seat and footrest features in respective exemplary upright positions thereof.

In an exemplary configuration, footrest generally 120 may be secured to frame 110 for example, by way of a plurality of hinges, such as exemplary hinges 122, 124, 126, 128. Such hinges permit movement of footrest 120 to either a respective downward position thereof as illustrated in FIG. 1 or an upright position thereof as illustrated in FIG. 2. A latch mechanism 112 may be secured to armrest portion generally 114 of frame 110 to further hold footrest 120 in its relative upright position. It should be appreciated that in alternative embodiments, footrest 120 may be solidly secured to frame 110 as by stitch welding, for example, or by any other suitable means if movement to an upright position is not desired.

It will be noticed that with seat 130 and footrest 120 both in their downward positions (present FIG. 1), partial access may be had to storage area generally 160 of golf cart 200. Footrest 120 may correspond to or encompass a number of different features including a foot supporting surface 138 (FIG. 1), a back panel 134, and a number of generally triangular supports 132, all of which will be described more fully herein with reference to present FIG. 4.

With reference now to FIG. 2, there is illustrated a right rear oblique view of golf cart 200 with an exemplary folding seat combination 100 attached illustrating the seat 130 and footrest 120 each in their upright positions and with backrest 140 respectively in a downward position. With seat 130 placed in such an exemplary upright position, access is more substantially available to storage area 160 at the rear of golf cart 200. Further, it will be observed that an optional golf bag holder or securement feature 170 may be situated to the underside of seat 130 so as to be exposed and available for securing golf bags or other items when seat 130 is in such an upright position. With footrest 120 in its upright position, storage area 160 is at least partially closed to the immediate rear of vehicle 200, so as to assist in preventing items that might be relatively loosely placed in storage area 160 from bouncing out of such area 160 during movement of golf cart 200.

Positioning backrest 140 in its downward position (FIG. 2) also per present subject matter assists in maintaining seat 130 in an upward position. Latch mechanism 112 may be used to assist in more securely maintaining footrest 120 in its upright position. An exemplary configuration of latching mechanism 112 is more fully described herein with reference to FIG. 6.

Figure 3:
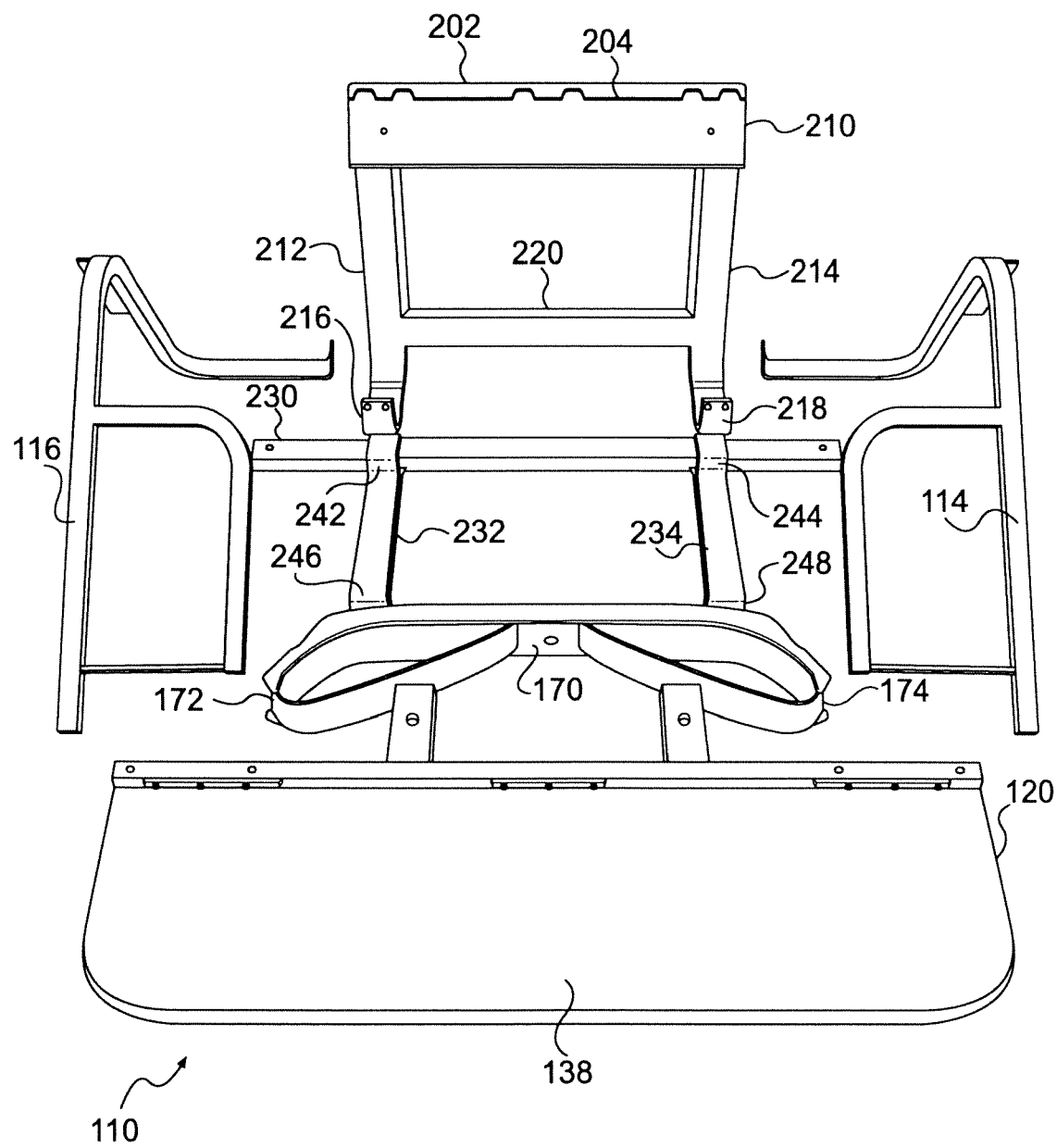
FIG. 3 illustrates a partially assembled/partially exploded view of frame features for an exemplary convertible combination in accordance with the present technology.

With reference to FIG. 3, there is illustrated a partially assembled/partially exploded exemplary frame 110 for a present folding seat combination 100 in accordance with the present technology. It should be appreciated that the components illustrated in FIG. 3 are shown laid out prior to assembly and are illustrated in such a configuration only for reference purposes. As will be understood by those of ordinary skill in the art from the disclosure herewith, the various components require repositioning before they may be attached to one another to form assembled frame 110.

As illustrated in FIG. 3, frame 110 includes a hinged backrest support 210 supported by way of a pair of hinges 202, 204 from a pair of upright supports 212, 214. Upright supports 212, 214 are coupled, respectively, at right angles to frame portions 216, 218 and may be further coupled together and reinforced by lateral support portion 220. Frame portions 216, 218 may be employed as mounting portions of frame 110, for example, to secure the assembled frame to golf cart 200 (whether as part of a "retrofit" to an existing vehicle or as part of features initially integrated during manufacture of such vehicle 200). In an exemplary embodiment, upright portions 212, 214 and corresponding frame portions 216, 218 may correspond to an integral portion appropriately bent at right angles to provide the required configuration. Alternatively, the various parts may be provided as separate pieces and later joined together by commonly available means, including, but not limited to, welding, riveting, and securing by nut and bolt.

With further reference to FIG. 3, frame portions 216, 218 may be coupled to seat supports 232, 234, respectively, by way of hinges 242, 244. Further, seat bottom support 230 (shown in FIG. 3 in disassembled form as positioned between the two halves of support structure corresponding to frame portions 216, 232, and 218, 234 respectively) may be secured by appropriate commonly available means similar to those commonly available means previously mentioned to the far ends 246, 248 of seat supports 232, 234, respectively. Additional view of the assembled portions of the frame relating to the seat support portions are seen and further described herein with reference to FIG. 5.

Further with respect to FIG. 3, optional golf bag holder 170 may be secured to end portions 246, 248 of seat supports 232, 234 proximate seat bottom support 230 by any suitable and commonly available means. Optional golf bag support 170 may be provided as a separate assembly comprising a support structure on which is positioned one or more strap assemblies herein illustrated for example as straps 172, 174. Straps 172, 174 may correspond to any suitable straps that may be employed to retain a golf bag or other items including, but not limited to, an integral elastomeric loop strap through which loop a golf bag or other items may be inserted, a pair of separable straps secured together in use by any suitable means including, but not limited to, hook and loop type closures, snap closures, buckles, tied ends, or any other suitable means, or any other suitable securing arrangement.

Further with respect to FIG. 3, armrest supports 114, 116 are illustrated in the disassembled view as if lying on the ground or a flat pre-assembly support surface. It should be appreciated from FIG. 3 taken with the other Figures in this application that armrest supports 114, 116 will be rotated into a relatively upright position to be positioned for inclusion as a portion of frame 110. Reference to FIG. 1, for example, additionally illustrates the final positioning of armrest supports 114, 116.

Figure 4:
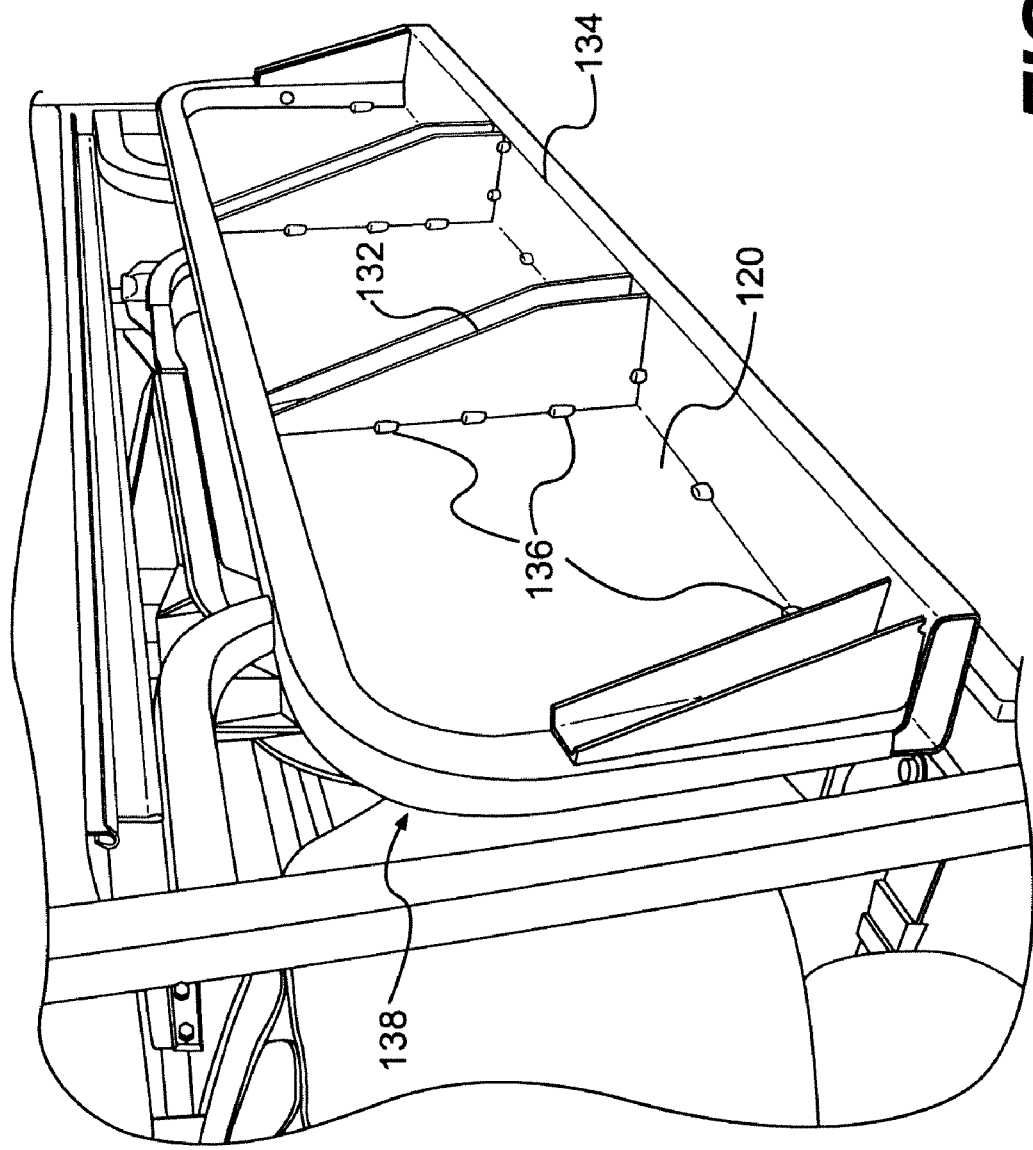
FIG. 4 illustrates a partial view of a present exemplary convertible combination illustrating a view of the footrest features thereof in an exemplary upright position.

With reference to FIG. 4, there is illustrated a partial view of an exemplary folding seat combination 100 constructed in accordance with the present subject matter and illustrating a close-up view of footrest 120 in an upright position thereof. As may be seen in FIG. 4, footrest 120 may correspond to a generally flat portion 138 on which passenger's feet or other items may be placed when footrest 120 is positioned in its downward position. The generally flat portion 138 of footrest 120 may be supported for example by securing by any suitable means a back panel 134 perpendicular to the back edge of generally flat portion 138, and by the placement of a plurality of generally triangular supports 132 as illustrated, engaging both back panel 134 and the underneath side of generally flat portion 138 of footrest 120. All of the components corresponding to footrest 120 including back panel 134, foot support portion 138, and generally triangular supports 132 may be secured together by any suitable means commonly available. In an exemplary embodiment of the present subject matter, stitch welds 136 appropriately positioned at multiple locations (as well understood to those of ordinary skill in the art without additional disclosure) may accomplish such securing. Other welding techniques may be employed as well as other joining techniques.

Figure 5:
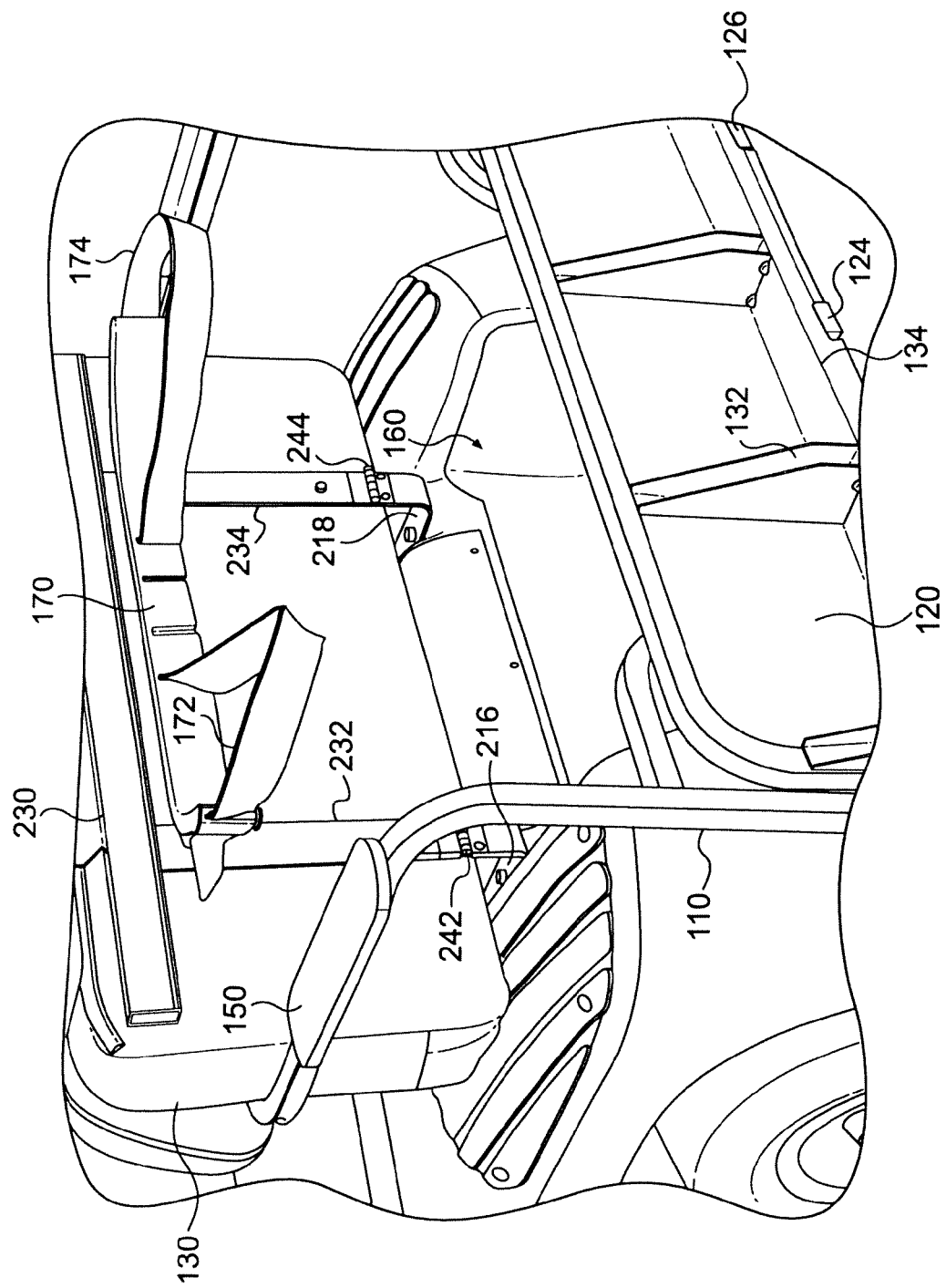
FIG. 5 illustrates a left rear oblique view complimentary to that of present FIG. 2, illustrating a more detailed view of such convertible folding seat and storage combination of the present subject matter with the seat and footrest features thereof both in exemplary upright positions.

With reference now to FIG. 5, there is illustrated a relatively enlarged left oblique rear view complimentary to that of FIG. 2 illustrating a more detailed view of folding seat combination 100 in accordance with the present technology, with the seat 130 and footrest 120 both illustrated in their respective upright positions. As may be seen in FIG. 5, footrest 120 may be positioned in an upright position by rotation of the front edge of footrest 120 upwardly through operation of a plurality of hinge couplings secured at the back edge of footrest 120. Representative such hinges 124, 126 may be seen in the lower right corner of FIG. 5. Further with respect to hinge couplings, hinges 242, 244 previously mentioned as coupling supports 216, 232, and 218, 234 may also be more clearly seen, positioned such that movement of seat 130 between upright and downward positions may be accomplished.

Figure 6:
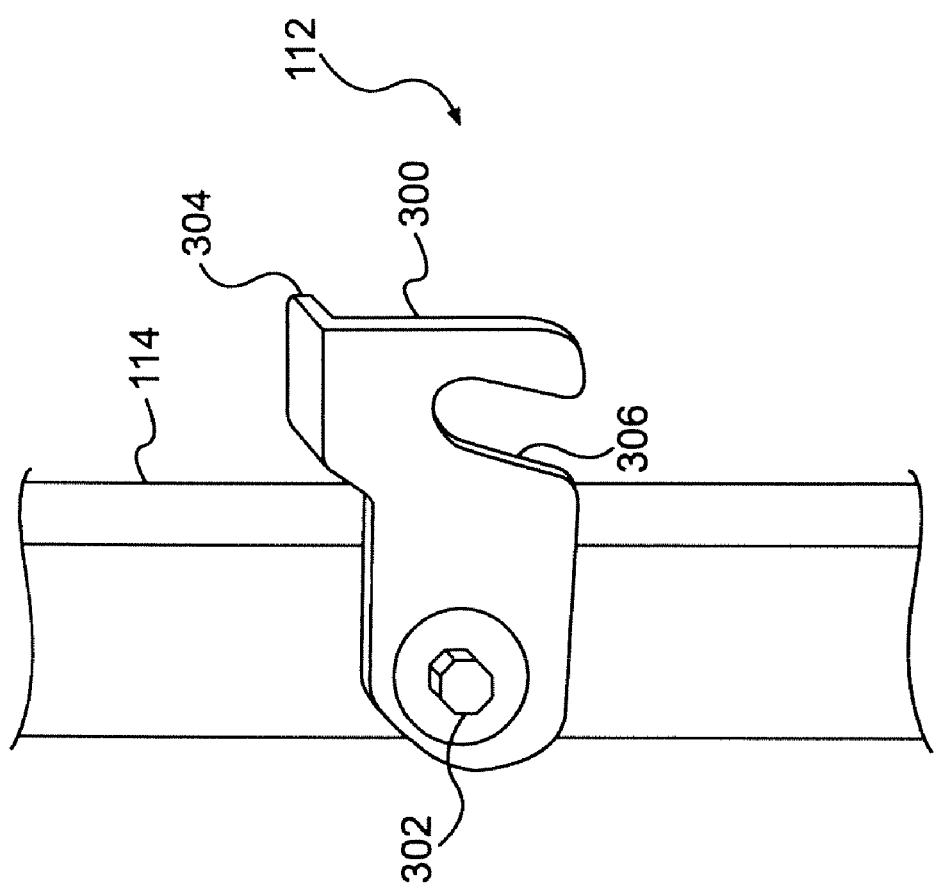
FIG. 6 illustrates an enlarged view in isolation of an exemplary latch mechanism for holding the seat portion of the convertible combination in an upright position, in accordance with present subject matter.

With reference now to FIG. 6, there is illustrated an exemplary latch mechanism generally 112 for holding footrest 120 of the folding seat combination in an upright position. Latch mechanism 112 corresponds in this exemplary embodiment to a shaped member 300 secured to armrest portion 114 of frame 110 (FIG. 1) by the use of a nut and bolt configuration 302 through a hole in one end of such member 300. Shaped member 300 of latch mechanism 112 includes a hand or finger operated portion 304 that may be used to alternatively and selectively position latch mechanism 112 in either of a relatively upright or relatively downward position, to selectively either release or lock the latch mechanism. Latch mechanism 112 includes a recessed portion 306 configured to engage with a bolt or other rod-like element (not illustrated) as may be secured to the side of footrest 120 such that a portion of such element may be partially surrounded and captured by recessed portion 306 so as to achieve a locking position when desired, so as to assist in maintaining footrest 120 in an upright position. Such bolt or rod-like element may be secured to footrest 120 in any suitable manner. In the instance that a blot is used, such bolt may be selected such that a significant portion thereof extends into the path of the latch mechanism 112 so as to be captured thereby. Alternatively, a rod-like element may be welded or otherwise secured to footrest 120 to provide an equivalent capturable element for cooperative interaction with latch mechanism 112. It should be appreciated that other forms of latches, for example, magnetic latches, may be employed to perform the function of latch mechanism 112.

While the present subject matter has been described in detail with respect to specific embodiments thereof, it will be appreciated that those skilled in the art, upon attaining an understanding of the foregoing may readily produce alterations to, variations of, and equivalents to such embodiments. For example, the present subject matter is not particularly limited to the specifics of many aspects of a recreational vehicle with which the present subject matter may be used. For example, whether such vehicle is battery powered or powered by some form of combustion engine, would normally not affect the present subject matter. Likewise, whether the vehicle has a "top" or canopy, or whether it has a particular body style or design, would generally not directly affect the present subject matter. Further, whether the present subject matter is provided as a vehicle retrofit, or whether such subject matter is integrally provided as such vehicle is initially assembled does not affect the broader aspects of the present subject matter. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A convertible folding seat and storage combination, comprising:
   a frame configured for attachment to a vehicle;
   a seat portion movably attached to said frame, said seat portion having an upper side and an underside, with a storage area formed under said seat portion;
   a backrest portion attached to said frame; and
   a footrest portion attached to said frame,
   wherein said seat portion is movably attached to said frame such that said seat portion may selectively be alternately positioned in one of a down position thereof so as to provide seating for an individual with said storage area situated thereunder, and in an up position thereof so as to provide full access to said storage area;
   said footrest portion is movably attached to said frame such that said footrest portion may selectively be alternately positioned in one of a down position thereof so as to provide a footrest for an individual seated on said seat portion when in the down position thereof, and in an up position thereof so as to provide at least partial closure of said storage area when said seat portion is in up position thereof; and
   said combination further comprises a latch movably attached to said frame, and configured to be selectively engaged with said footrest portion such that said latch may secure said footrest portion in said up position thereof.

2. The convertible folding seat and storage combination as in claim 1, wherein said backrest portion is movably attached to said frame such that said backrest portion may selectively be alternately positioned in one of a down position thereof so as to provide a backrest for an individual seated on said seat portion when in the down position thereof, and in an up position thereof for assisting to secure said seat portion when in the up position thereof.

3. The convertible folding seat and storage combination as in claim 1, further comprising at least one securing device attached to said underside of said seat portion, for securing at least one item for transport while said seat portion is in an up position thereof.

4. The convertible folding seat and storage combination as in claim 3, wherein said securing device comprises at least one pair of securing straps.

5. A convertible folding seat and storage combination, comprising:
   a frame configured for attachment to a vehicle;
   a seat portion movably attached to said frame, said seat portion having an upper side and an underside, with a storage area formed under said seat portion;
   a backrest portion attached to said frame; and
   a footrest portion attached to said frame,
   wherein said seat portion is movably attached to said frame such that said seat portion may selectively be alternately positioned in one of a down position thereof so as to provide seating for an individual with said storage area situated thereunder, and in an up position thereof so as to provide full access to said storage area; and
   said backrest portion and footrest portion are respectively movably attached to said frame such that said backrest portion and footrest portion may selectively be alternately positioned in one of respective down positions thereof so as to provide a backrest and footrest respectively for an individual seated on said seat portion when in the down position thereof, and in respective up positions thereof for assisting to secure said seat portion and to provide at least partial closure of said storage area respectively when said seat portion is in the up position thereof; and
   said combination further comprising at least one pair of securing straps attached to said underside of said seat portion, for securing at least one item for transport while said seat portion is in an up position thereof; and
   a latch movably attached to said frame, and configured to be selectively engaged with said footrest portion such that said latch may secure said footrest portion in said up position thereof.

6. A vehicle, comprising:
   a front seat configured to provide seating for a vehicle operator; and
   a rear convertible seat comprising a frame attached to said vehicle, a seat portion attached to said frame with a storage area formed under said seat portion, a backrest portion attached to said frame, and a footrest portion attached to said frame, wherein said seat portion is movably attached to said frame such that said seat portion may selectively be alternately positioned in one of a down position thereof so as to provide seating for an individual with said storage area situated thereunder, and in an up position thereof so as to provide full access to said storage area; and further comprising at least one securing device attached to said underside of said seat portion, for securing at least one item for transport while said seat portion is in an up position thereof;

wherein said vehicle comprises a golf cart type recreational vehicle, and said securing device comprises at least one pair of securing straps for securing a golf bag to said vehicle.

7. The vehicle as in claim 6, wherein said backrest portion is movably attached to said frame such that said backrest portion may selectively be alternately positioned in one of a down position thereof so as to provide a backrest for an individual seated on said seat portion when in the down position thereof, and in an up position thereof for assisting to secure said seat portion when in the up position thereof.

8. The vehicle as in claim 6, wherein said rear convertible seat is positioned such that an individual seated on said rear convertible seat faces the rear of the vehicle.

9. A vehicle, comprising:
a front seat configured to provide seating for a vehicle operator; and
a rear convertible seat comprising a frame attached to said vehicle, a seat portion attached to said frame with a storage area formed under said seat portion, a backrest portion attached to said frame, and a footrest portion attached to said frame,
wherein said seat portion is movably attached to said frame such that said seat portion may selectively be alternately positioned in one of a down position thereof so as to provide seating for an individual with said storage area situated thereunder, and in an up position thereof so as to provide full access to said storage area; and
wherein said footrest portion is movably attached to said frame such that said footrest portion may selectively be alternately positioned in one of a down position thereof so as to provide a footrest for an individual seated on said seat portion when in the down position thereof, and in an up position thereof so as to provide at least partial closure of said storage area when said seat portion is in up position thereof; and
said vehicle further comprising a latch movably attached to said frame, and configured to be selectively engaged with said footrest portion such that said latch may secure said footrest portion in said up position thereof.

10. The vehicle as in claim 9, further comprising at least one securing device attached to said underside of said seat portion, for securing at least one item for transport while said seat portion is in an up position thereof.

11. The vehicle as in claim 10, wherein said vehicle comprises a golf cart type recreational vehicle, and said securing device comprises at least one pair of securing straps for securing a golf bag to said vehicle.

12. A vehicle, comprising:
a front seat configured to provide seating for a vehicle operator; and
a rear convertible seat comprising a frame attached to said vehicle, a seat portion attached to said frame with a storage area formed under said seat portion, a backrest portion attached to said frame, and a footrest portion attached to said frame,
wherein said seat portion is movably attached to said frame such that said seat portion may selectively be alternately positioned in one of a down position thereof so as to provide seating for an individual with said storage area situated thereunder, and in an up position thereof so as to provide full access to said storage area; and
said backrest portion and footrest portion are respectively movably attached to said frame such that said backrest portion and footrest portion may selectively be alternately positioned in one of respective down positions thereof so as to provide a backrest and footrest respectively for an individual seated on said seat portion when in the down position thereof, and in respective up positions thereof for assisting to secure said seat portion and to provide at least partial closure of said storage area respectively when said seat portion is in the up position thereof,
said vehicle comprises a golf cart type recreational vehicle; and
said rear convertible seat is positioned such that an individual seated on said rear convertible seat faces the rear of the vehicle; and
said vehicle further comprising at least one securing device attached to said seat portion, and comprising at least one pair of securing straps for securing a golf bag to said vehicle; and
a latch movably attached to said frame, and configured to be selectively engaged with said footrest portion such that said latch may secure said footrest portion in said up position thereof.

13. A vehicle, comprising:
a front seat configured to provide seating for a vehicle operator; and
a rear convertible seat comprising a frame attached to said vehicle, a seat portion attached to said frame with a storage area formed under said seat portion, a backrest portion attached to said frame, and a footrest portion attached to said frame,
wherein said seat portion is movably attached to said frame such that said seat portion may selectively be alternately positioned in one of a down position thereof so as to provide seating for an individual with said storage area situated thereunder, and in an up position thereof so as to provide full access to said storage area; and
wherein said footrest portion is movably attached to said frame such that said footrest portion may selectively be alternately positioned in one of a down position thereof so as to provide a footrest for an individual seated on said seat portion when in the down position thereof, and in an up position thereof so as to provide at least partial closure of said storage area when said seat portion is in up position thereof;
said vehicle further comprising at least one securing device attached to said underside of said seat portion, for securing at least one item for transport while said seat portion is in an up position thereof; and
wherein said vehicle comprises a golf cart type recreational vehicle, and said securing device comprises at least one pair of securing straps for securing a golf bag to said vehicle.

* * * * *